United States Patent [19]

Koitabashi

[11] Patent Number: 5,392,889
[45] Date of Patent: Feb. 28, 1995

[54] ELECTROMAGNETIC CLUTCH WITH AN IMPROVED ELECTROMAGNETIC HOUSING

[75] Inventor: Takatoshi Koitabashi, Richardson, Tex.

[73] Assignee: Sanden Corporation, Isesaki, Japan

[21] Appl. No.: 64,433

[22] Filed: May 21, 1993

[30] Foreign Application Priority Data

May 21, 1992 [JP] Japan .............. 4-033616[U]

[51] Int. Cl.⁶ .......................................... F16D 27/00
[52] U.S. Cl. .................................. 192/84 C; 29/606
[58] Field of Search ............. 192/84 C, 84 R; 29/606

[56] References Cited

U.S. PATENT DOCUMENTS

| | | |
|---|---|---|
| 2,860,403 | 11/1958 | Meyer ..................... 192/84 C X |
| 3,036,679 | 5/1962 | Millington et al. . |
| 3,130,355 | 4/1964 | Younger ..................... 29/606 X |
| 3,565,223 | 2/1971 | Pierce . |
| 3,833,871 | 9/1974 | Fisher et al. . |
| 3,857,468 | 11/1974 | Iritono et al. ................. 192/84 C |
| 3,995,244 | 11/1976 | Sayo ..................... 192/84 C X |
| 4,432,446 | 2/1984 | Okano et al. . |
| 4,547,757 | 10/1985 | Yamada . |
| 4,642,031 | 2/1987 | Farr ..................... 192/84 C X |
| 4,694,945 | 9/1987 | Koitabashi ................. 192/84 C |
| 4,799,578 | 1/1989 | Matsushita . |
| 4,955,954 | 9/1990 | Ohishi et al. ............. 192/84 C X |
| 4,973,870 | 11/1990 | Uehara ..................... 192/84 C X |
| 5,046,594 | 9/1991 | Kakinuma ................. 192/84 C |
| 5,080,214 | 1/1992 | Fossum ..................... 192/84 C X |
| 5,121,093 | 6/1992 | Matsushita . |
| 5,137,132 | 8/1992 | Cerny ..................... 192/84 C |
| 5,148,902 | 9/1992 | Nakamura ................. 192/84 C X |
| 5,184,705 | 2/1993 | Sekiguchi, deceased et al. ... 192/84 C |
| 5,195,625 | 3/1993 | Chang et al. .................. 192/84 C |

FOREIGN PATENT DOCUMENTS

1119006 7/1968 United Kingdom .

Primary Examiner—Andrea L. Pitts
Attorney, Agent, or Firm—Baker & Botts

[57] ABSTRACT

A clutch for an automotive air conditioning compressor includes a pulley forming a hollow space in which an electromagnetic housing is disposed. The electromagnetic housing comprises a first housing portion and a second separately formed housing portion. The first housing portion includes a first annular cylindrical region and a first annular region extending from the first annular cylindrical region. The second housing portion includes a second annular cylindrical region and a second annular region extending from the second annular cylindrical region. The first and second annular regions are operatively coupled together and their coupled surfaces define a rear side of the electromagnetic housing. Because most of the flux flowing through the electromagnetic housing flows through the rear side thereof, by forming the electromagnetic housing from first and second housings, a thicker magnetic flux flow path is formed, thereby improving the magnetic attraction and torque transfer from the pulley to the armature plate.

20 Claims, 9 Drawing Sheets

ELECTROMAGNETIC CLUTCH WITH AN IMPROVED ELECTROMAGNETIC HOUSING

BACKGROUND OF THE INVENTION

1. Field of The Invention

The invention relates to electromagnetic clutches and, more particularly, to an improved magnetic housing for an electromagnetic clutch.

2. Description of the Related Art

Figure 1:
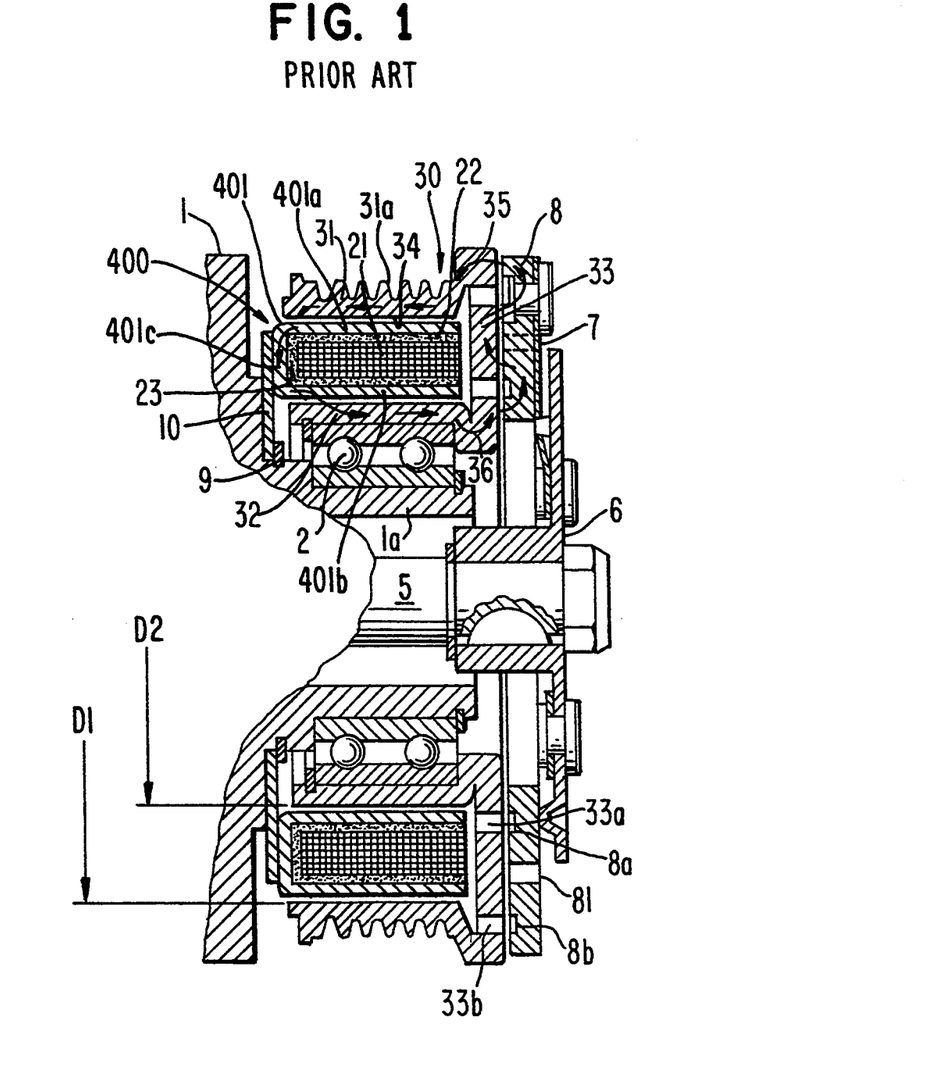
FIG. 1 a cross-sectional view of a conventional electromagnetic clutch in accordance with the prior art.

A conventional electromagnetic clutch is described, for example, in U.S. Pat. No. 4,694,945. Such a conventional electromagnetic clutch is shown in FIG. 1 and includes magnetic pulley 30 which is rotatably mounted on tubular extension 1a of compressor housing 1 through bearing 2. Magnetic pulley 30 is rotated by an external power source through a belt (not shown). Electromagnetic device 400 is disposed in a stationary position in a hollow portion defined by pulley 30 and is secured on compressor housing 1 through support plate 10. Hub 6 is secured on the outer terminal end of drive shaft 5. Armature plate 8 is supported on hub 6 by a plurality of leaf springs 7. Armature plate 8 faces the axial end surface of pulley 30 with a predetermined axial gap therebetween and, through the resiliency of leaf springs 7, is capable of limited axial movement.

In the above described electromagnetic clutch, pulley 30 includes outer cylindrical portion 31 on which belt receiving grooves 31a are formed, inner cylindrical portion 32, and axial end plate portion 33 connecting the outer and inner cylindrical portions 31 and 32. Annular hollow portion 34 is defined by cylindrical portions 31 and 32 and axial end plate portion 33. Outer and inner cylindrical portions 31 and 32 are connected to axial end plate portion 33 through step portion 35 and 36, respectively. Stationary electromagnetic device 400 is placed within hollow portion 34.

Electromagnetic coil 21 is fixedly disposed within an annular hollow space 23 of annular electromagnetic housing 401 by insulating resin 22. Annular electromagnetic housing 401 has a U-shaped cross section and is fixed to supporting plate 10 by spot welding. Housing 401 comprises outer and inner cylindrical portions 401a and 401b connected by axial annular end plate portion 401c. Annular electromagnetic housing 401 is secured to the axial end surface of housing 1 by a snap ring 9. A small air gap is maintained between annular electromagnetic housing 401 and pulley 30.

Axial end plate portion 33 is provided with concentric slits 33a and 33b to form a plurality of concentric annular magnetic pole faces. A plurality of annular shaped grooves 8a and 8b are formed on the axial end surface of armature plate 8 opposite axial end plate portion 33 of pulley 30. Annular grooves 8a and 8b face concentric slits 33a and 33b. Armature plate 8 also includes slit 81 placed midway between annular shaped grooves 8a and 8b. As a result, armature plate 8 is divided into four pole portions by slits 33a and 33b and grooves 8a and 8b, so that magnetic flux zigzags between axial end plate portion 33 and armature plate 8.

In the above arrangement, when electromagnetic coil 21 is energized, magnetic flux, as indicated by arrows, is produced and flows through a closed loop including axial annular end plate portion 401c of electromagnetic housing 401, inner cylindrical portion 401b, inner cylindrical portion 32, outer bearing race 2, step portion 36, armature plate 8, axial end plate 33, step portion 35 and outer cylindrical portion 31. Armature plate 8 is attracted to axial end plate portion 33, so that drive shaft 5 is rotated together with pulley 30 in a manner similar to conventional electric magnetic clutches. When electromagnetic coil 21 is de-energized, armature plate 8 separates from pulley 30 and returns to its original position due to the recoil strength of leaf springs 7. Therefore, pulley 30 continues to rotate although the electromagnetic clutch is disengaged.

The magnetic attraction between pulley 30 and armature plate 8 is related to the magnetic flux flowing through the closed loop. It is advantageous for the magnetic reluctance of the closed loop to be relatively low. The magnetic reluctance of the loop is directly proportional to the sectional area of the magnetic flux flowing through the closed loop. Therefore, the sectional area of axial annular end plate portion 401c of electromagnetic housing 401 should be larger than that of outer and inner cylindrical portion 401a and 401b of electromagnetic housing 401 because most of the magnetic flux flows through axial annular end plate portion 401c in comparison with outer and inner cylindrical portions 401a and 401b.

In today's smaller cars, the space in which the engine and accessories, such as automotive compressors, are mounted has become smaller. Nevertheless, while the size of the compressor is reduced, its capacity is still required to be sufficient enough to cool the passenger compartment. To achieve this objective, the diameter of pulley 30 could be reduced. This may increase the rotation speed of the pulley 30. In this reduced diameter pulley, the distance between inner diameter D1 of outer cylindrical portion 31 and outer diameter D2 of inner cylindrical portion 32 decreases. Moreover, as a result of such a reduction, the distance between concentric slits 33a and 33b also decreases. This in turn reduces the frictional contact surface between armature plate 8 and pulley 30. This reduction, however, has the disadvantage of reducing the transmitted torque. To overcome this reduction in torque transmission, the axial end surface of the axial end plate portion 33 has step portions 35 and 36 formed on the outer peripheral portion of axial end plate portion 33 for increasing the contact surface area between pulley 30 and armature plate 8. Therefore, the outer diameter of outer cylindrical portion 31, on which belt-receiving grooves 31a are formed, can be made smaller than the outer diameter of axial end plate portion 33, so that high rotating speeds can be accomplished without too much reduction of torque transmission.

Figure 2A:
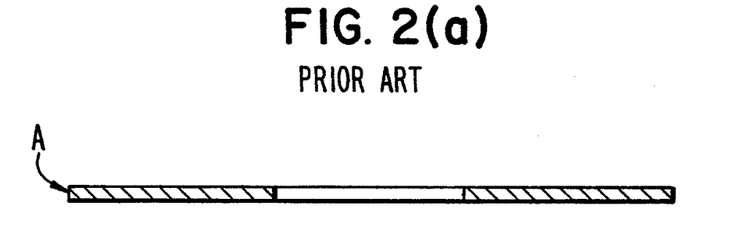
FIGS. 2(a)–2(b) are cross-sectional views of a magnetic housing for a conventional electromagnetic clutch.
Figure 2B:
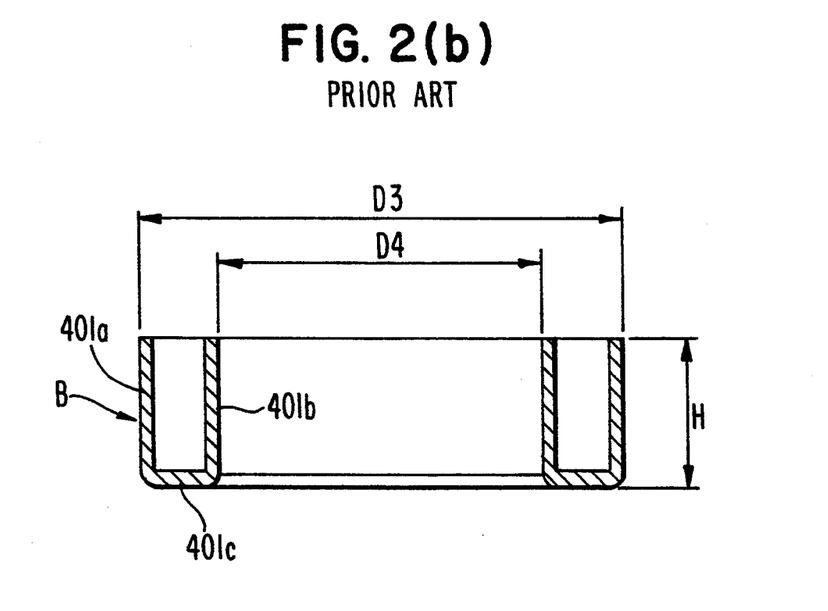

Referring to FIGS. 2(a)–2(b), a method of producing electromagnetic housing 401 is disclosed in accordance with the above described electromagnetic clutch. Electromagnetic housing 401 according to the prior art is formed as a single, unitary body of magnetic material. First, a magnetic circular plate A of a predetermined dimension with a central opening is prepared. Magnetic circular plate A is then press-drawn to form annular blank B (FIG. 2(b)) having outer annular cylindrical portion 401a, inner annular cylindrical portion 401b, and axial end annular plate portion 401c. Blank B then is subjected to a reverse drawing or upset working to press outer and inner cylindrical portions 401a and 401b. Thus, electromagnetic housing 401 forms a hollow portion in which electromagnetic coil 21 is disposed. Cover plate 10 is fixed to the end surface of axial end plate portion 401 c by brazing. Further, the inner end of cover plate 10 is secured to an axial end surface of housing 1 by snap ring 9.

If, during the press-drawing step, the relative dimensions between D3 and D4 and H (FIG. 2(b)) are not adequately established, outer annular cylindrical portion 401a, inner annular cylindrical portion 401b, and axial end annular plate 401c may be formed with differing thicknesses. These variations may become especially apparent in axial annular end plate 401c. Consequently, during the press-drawing step, the thinner portions of blank B may be partly crushed. Preferably, the relative sizes of D1, D2 and H may be approximated from the following equation:

$$\frac{H}{(D1 + D2)/2} = 2.4$$

Magnetic circular plate A should be sufficiently thick, e.g., about 5 mm, so that axial end plate 401c has a small magnetic reluctance therein. Due to this increased thickness of magnetic circular end plate A, however, more heat is generated between the press-drawing die and the work piece during the press drawing step. If enough heat is generated, the work piece bonds to the press-drawing die. To prevent this, the work piece may be bathed with a metallic soap treatment before the press-drawing step. Further, the material cost of a magnetic circular plate A is relatively high because a relatively thick but malleable material must be employed. Consequently, the prior art electromagnetic housing 401 requires sophisticated manufacturing process techniques and astute material selection.

SUMMARY OF THE INVENTION

It is an object of this invention to provide an improved electromagnetic housing for an electromagnetic clutch which is of simple construction and has low production costs.

It is another object of this invention to provide a method for producing a magnetic housing having accurate dimensions.

According to the present invention, an electromagnetic clutch includes a first rotatable member of magnetic material rotatably supported on a bearing which is mounted on a tubular extension of the compressor housing. An electromagnetic housing is fixedly secured to the mount member. The first rotatable member includes an outer annular cylindrical portion, an inner annular cylindrical portion and an axial end plate portion connecting the outer annular cylindrical portion and the inner annular cylindrical portion. The outer and inner annular cylindrical portions and the axial end plate portion define an inner hollow space in which the electromagnetic housing is disposed. The electromagnetic housing has a U-shaped cross section whereby an annular hollow space is defined therein. An annular magnetic coil is fixedly disposed within the annular hollow space.

The electromagnetic clutch further includes a second rotatable member, a hub secured on the second rotatable member and a magnetic armature plate supported on the hub by a plurality of leaf springs. The magnetic armature plate faces the first rotatable member with a predetermined axial air gap therebetween and is capable of limited axial movement due to the recoil strength of leaf springs. The magnetic armature plate is attracted to the first rotatable member when the annular magnetic coil is energized.

The electromagnetic housing is divided into a first portion and a second portion which is separate from the first portion. The first portion includes a first annular cylindrical region and a first annular region which extends from one end of the first annular cylindrical region in a first direction. The second portion includes a second annular cylindrical region and a second annular region which extends from one end of the second annular cylindrical region in a second direction opposite to the first direction. The first annular region of the first portion and the second annular region of the second portion overlap each other.

Other objects, advantages and features of this invention will be understood when the detailed description of the invention and the drawings are considered.

DETAILED DESCRIPTION OF PREFERRED EMBODIMENTS

The preferred embodiments of the present invention are similar to the conventional electromagnetic clutch shown in FIG. 1 except for the construction of electromagnetic housing 40. Therefore, similar parts are represented by the same reference characters as in FIG. 1 and the detailed description of the similar parts will be omitted in order to simplify the following description of the preferred embodiments.

Figure 3:
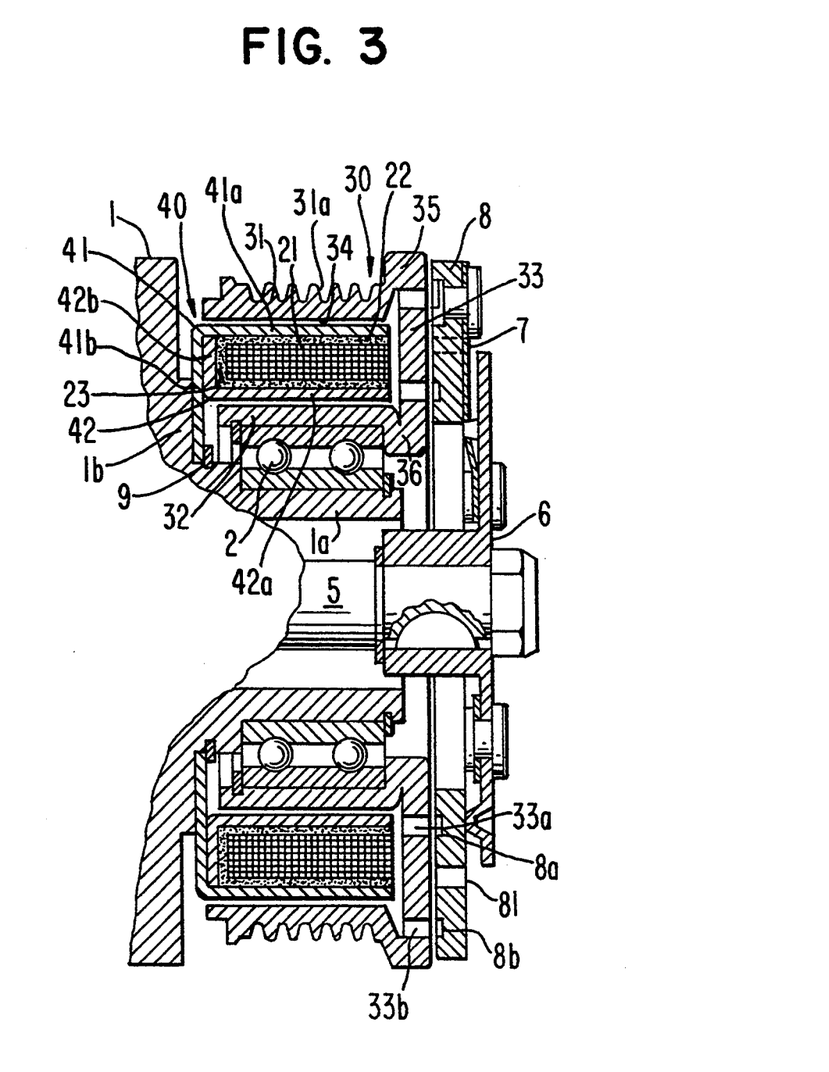
FIG. 3 is a cross-sectional view of an electromagnetic clutch in accordance with a first preferred embodiment.

Referring to FIG. 3, outer magnetic housing 41 includes cylindrical portion 41a and axial end plate portion 41b extending radially inwardly from cylindrical portion 41a. Inner magnetic housing 42 includes cylindrical portion 42a and axial flange portion 42b extending radially outwardly from cylindrical portion 42a. Inner magnetic housing 42 is positioned within outer magnetic housing 41, so that radially outwardly extending axial flange portion 42b is disposed against radially inwardly extending axial end plate portion 41b.

Figure 7A:
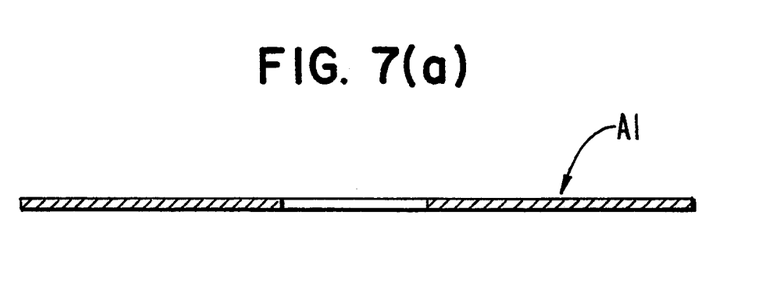
FIGS. 7(a)–7(f) are cross-sectional views of preferred magnetic housings during the various stages of production.
Figure 7B:
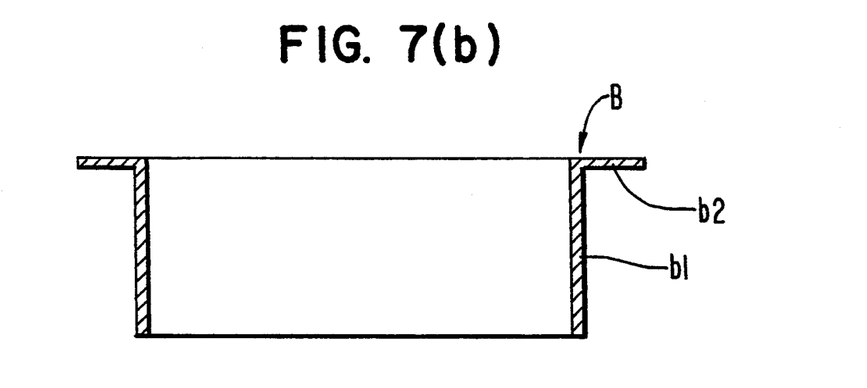
Figure 7C:
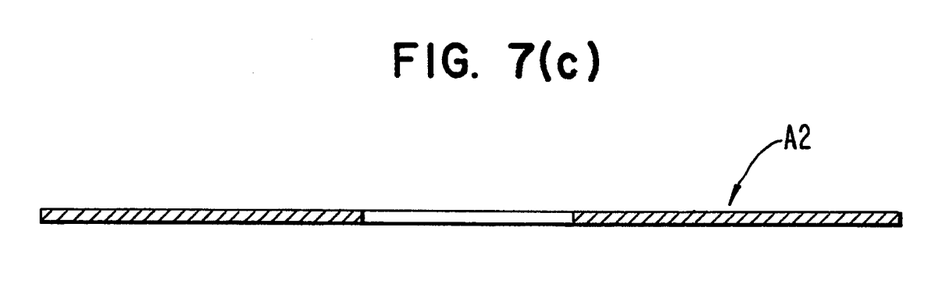

With reference to FIGS. 7(a)–7(c), several of the manufacturing steps in making the electromagnetic housing according to one preferred embodiment are depicted. First, a magnetic circular plate A1 is formed with a central opening. Preferably, circular plate A1 is manufactured from any suitable magnetic material which can be press-drawn. Magnetic circular plate A1, which is about 2 mm in thickness, is press-drawn to form annular blank B (FIG. 7(b)) having inner cylindrical portion b1 and axial flange portion b2 which is substantially perpendicular to inner cylindrical portion b 1.

Figure 7D:
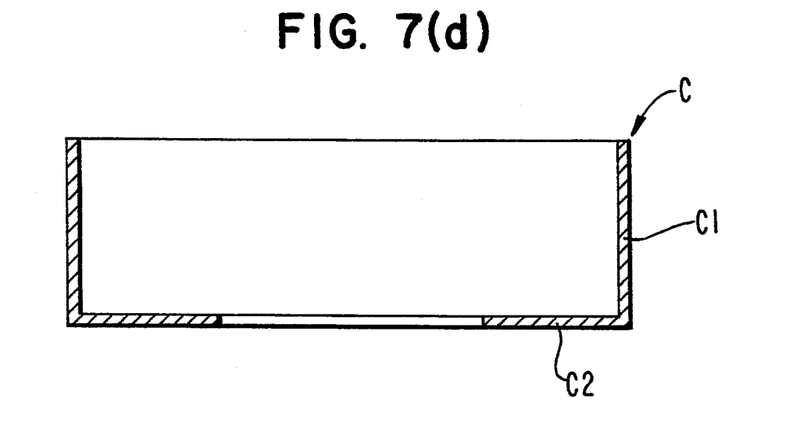

Also, magnetic circular plate A2 (FIG. 7(c)) is press-drawn to form annular blank C (FIG. 7(d)) having outer cylindrical portion c1 and end plate portion c2 which is substantially perpendicular to outer cylindrical portion c1.

Figure 7E:
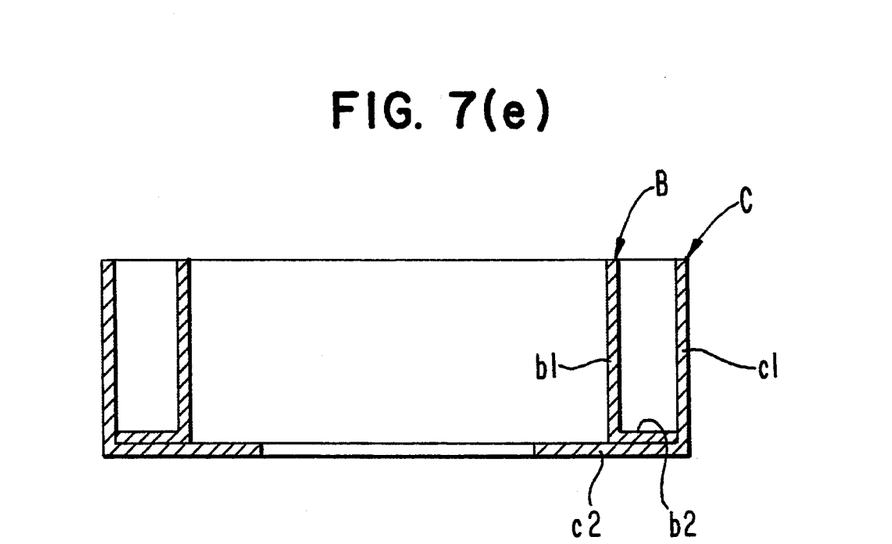
Figure 7F:
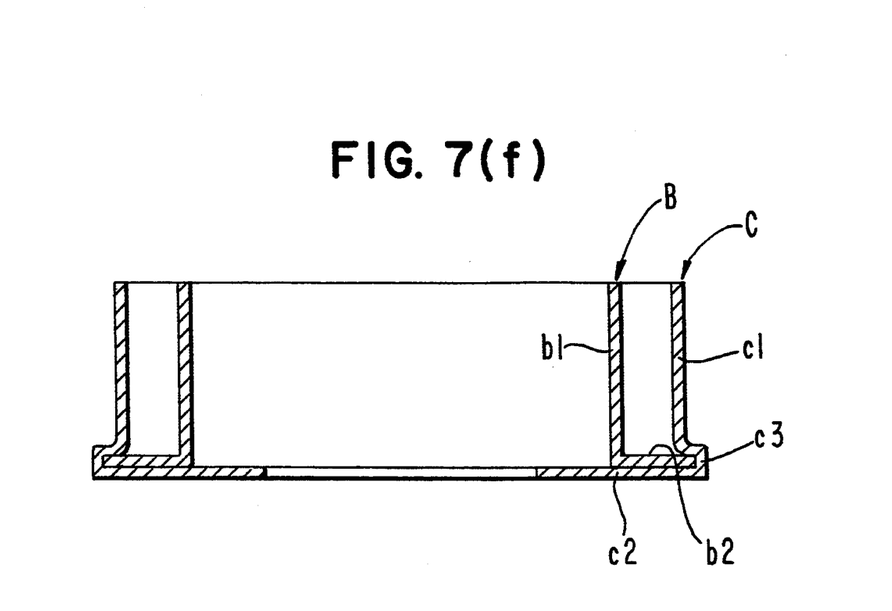

Next, blank B is positioned within blank C, and the two blanks may be connected by electric brazing. More particularly, bottom end plate portion c2 is placed over and fixed to axial flange portion b2, so that the outer edge of axial flange portion b2 abuts the inner side of outer cylindrical portion c1. The resulting configuration is best seen in FIG. 7(e). Alternatively, instead of using an electric brazing process, blank C can be connected with blank B by pressing outer cylindrical portion c1, so that step portion c3 (FIG. 7(f)) is formed. Consequently, axial flange portion b2 is locked into step portion c3. When so assembled, both outer magnetic housing 41 and inner magnetic housing 42 form a hollow portion in which magnetic coil 21 is contained.

Referring again to FIG. 3, outer magnetic housing 41 is connected with inner magnetic housing 42 by electric brazing, such that axial flange portion 42b is placed over axial end plate portion 41b and the outer edge of axial flange portion 42b abuts the inner side surface of cylindrical portion 41a. Electromagnetic housing 40 is secured to the axial end surface 41b of compressor housing 1 by snap ring 9.

Figure 4:
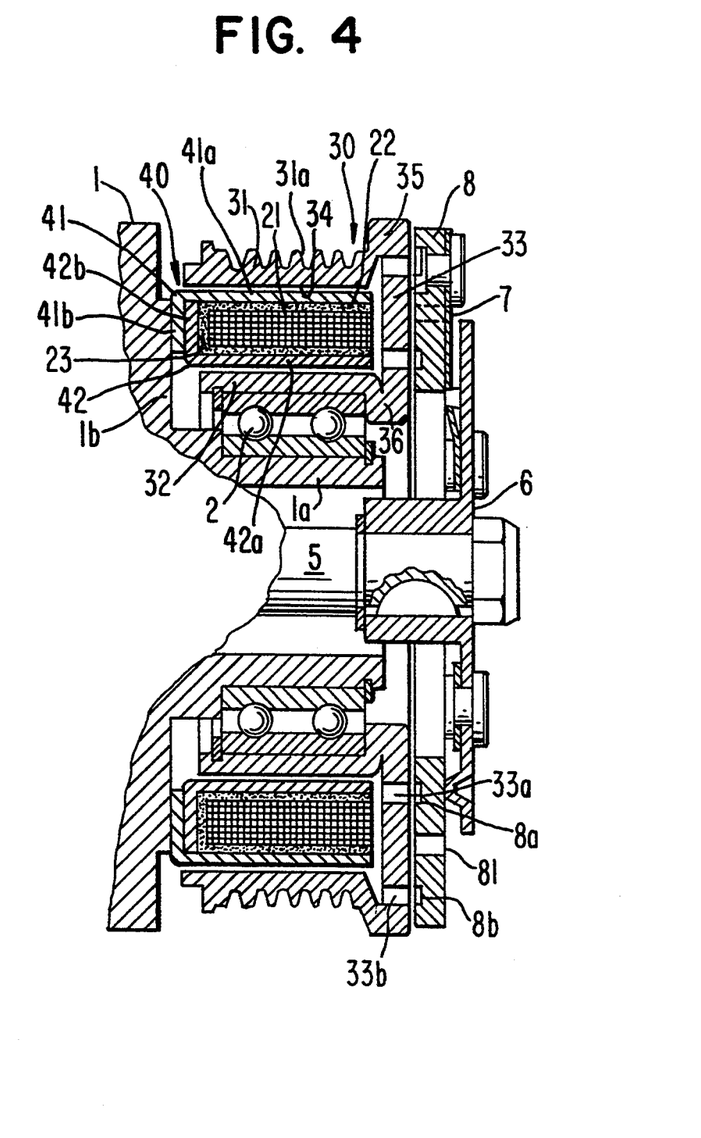
FIG. 4 is a cross-sectional view of an electromagnetic clutch in accordance with a second preferred embodiment.

With reference to FIG. 4, an electromagnetic housing 40 according to another preferred embodiment is depicted. In this embodiment, outer magnetic housing 41 may be connected with inner magnetic housing 42 by electric brazing, such that axial flange portion 42b is placed over axial end plate portion 41b, and the outer edge of axial flange portion 42b abuts the inner side surface of cylindrical portion 41a. Electromagnetic housing 40 may be secured to the axial end surface 1b of compressor housing 1 through the outer surface of axial end plate portion 41 b by an adhesive material or brazing.

Figure 5:
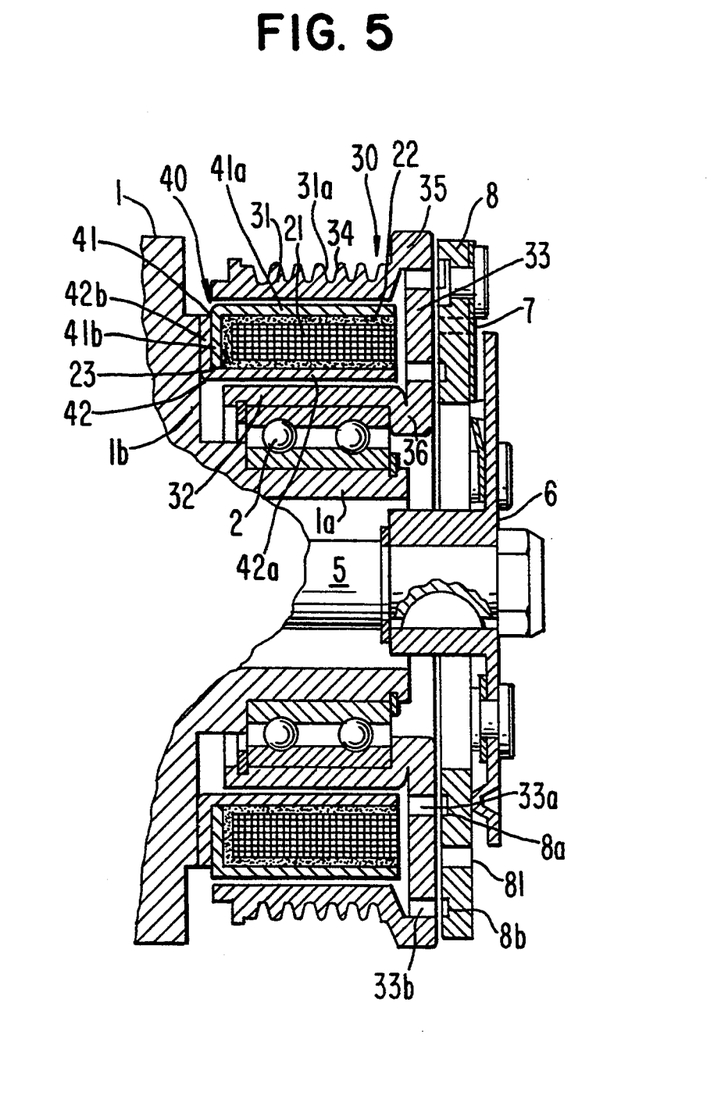
FIG. 5 is a cross-sectional view of an electromagnetic clutch in accordance with a third preferred embodiment.

With reference to FIG. 5, an electromagnetic housing 40 according to yet another preferred embodiment is depicted. In this embodiment, outer magnetic housing 41 may be connected with inner magnetic housing 42 by electric brazing, such that axial end plate portion 41b is placed over axial flange portion 42b, and the inner edge of axial end plate portion 41b abuts the inner side of cylindrical portion 42a. Electromagnetic housing 40 again may be secured to the axial end surface 1 b of compressor housing 1 through the outer surface of axial flange portion 42b by an adhesive material or brazing.

Figure 6:
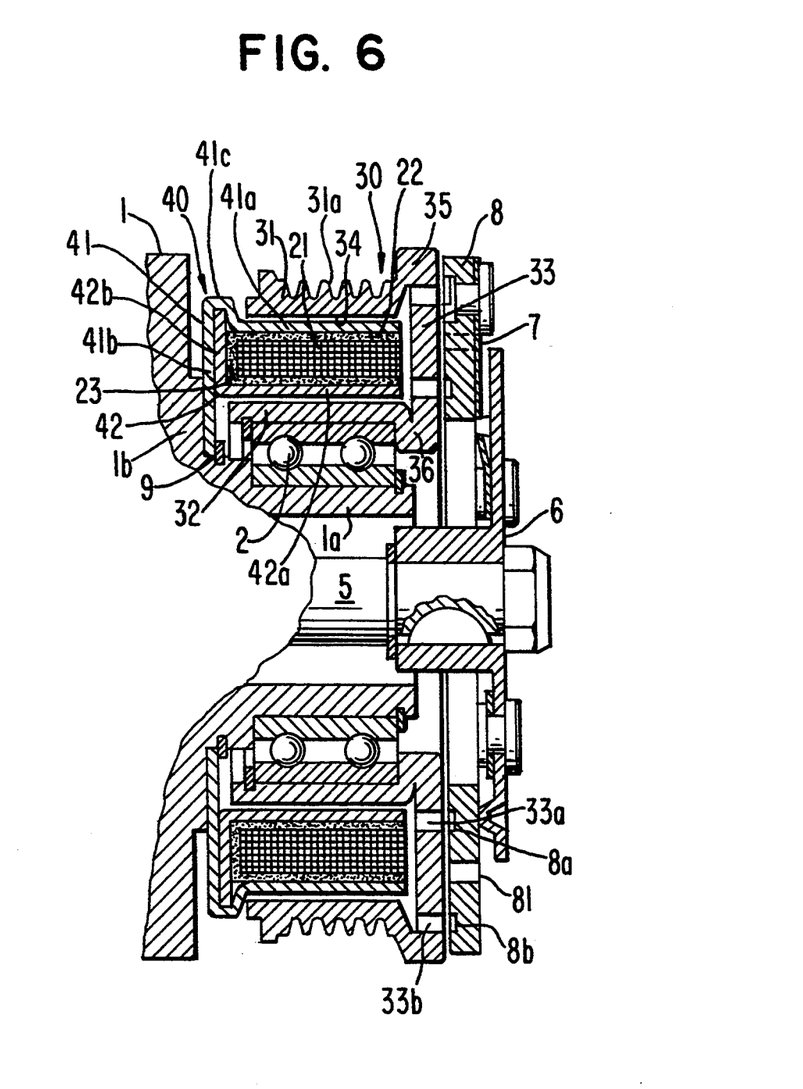
FIG. 6 is a cross-sectional view of an electromagnetic clutch in accordance with a fourth preferred embodiment.

Finally, with reference to FIG. 6, an electromagnetic housing 40 according to still another preferred embodiment is depicted. In this embodiment, outer magnetic housing 41 and inner magnetic housing 42 may be connected without brazing. Instead, after axial end plate portion 41b is placed over axial flange portion 42b, but before assembly into the compressor unit, outer cylindrical portion 41a may be caulked to form a step portion 41c. Axial flange portion 42b is thus secured against axial end plate portion 41b by step 41c. Electromagnetic housing 40 is secured to the axial end surface 41b of compressor housing 1 by snap ring 9.

With each of the preferred embodiments, the axial end portion of magnetic housing 40 obtains a thickness which is at least about twice the thickness of outer and inner cylindrical portions 41a and 42a of magnetic housing 40. This increased thickness in turn reduces the reluctance, so that a more effective electromagnetic flow path may be established. Consequently, even when a smaller sized compressor is required, the electromagnetic housing according to the preferred embodiments provides a sufficiently large electromagnetic flow path to compensate for the reduction in the size of the compressor and associated electromagnetic clutch.

Moreover, in the above described method of manufacturing an electromagnetic housing, it is not necessary to treat the housing blanks with a metallic soap coating before press-drawing thereof. The elimination of the requirement for this coating is due to the reduced thickness of the blanks which are used to form the magnetic housing. Because the magnetic circular plates A1 and A2 can be relatively thin, less heat is generated between the press-drawing die and the work piece. Consequently, the metallic soap coating is not needed, and a more efficient and continuous press-drawing manufacturing process can be employed.

Further, the material cost of the magnetic plate is decreased because a thin, inexpensive and ordinary magnetic plate can be used.

Although the present invention has been described in connection with the preferred embodiments, the invention is not limited thereto. It will be easily understood by those of ordinary skill in the art that variations and modifications can easily be made within the scope of this invention as defined by the appended claims.

I claim:

1. An electromagnetic clutch comprising:
   a first rotatable member of magnetic material rotatably supported on a bearing, said bearing mounted on a mount member;
   said first rotatable member including an outer annular cylindrical portion, an inner annular cylindrical portion, and an axial end plate connecting said outer annular cylindrical portion and said inner annular cylindrical portion, said outer and inner annular cylindrical portions and said axial end plate defining an inner hollow space;
   an electromagnetic housing fixedly secured to said mount member and extending within said inner hollow space, said electromagnetic housing being formed with a U-shaped cross section whereby an annular hollow space is defined therein;
   said electromagnetic housing comprising a first portion and a second portion;
   said first portion including a first annular cylindrical region and a first annular region radially extending from one end of said first annular cylindrical region in a first direction;
   said second portion including a second annular cylindrical region and a second annular region radially extending from one end of said second annular cylindrical region in a second direction opposite to said first direction;
   said first annular region of said first portion and said second annular region of said second portion operatively coupled together;
   an annular magnetic coil fixedly disposed within said annular hollow space of said electromagnetic housing;
   a second rotatable member;
   a hub secured on said second rotatable member; and
   a magnetic armature plate supported on said hub, said magnetic armature plate facing said first rotatable member with a predetermined axial air gap therebetween and having limited axial movement, said magnetic armature plate being attracted to said first rotatable member when said annular magnetic coil is energized;

wherein said first annular cylindrical region of said first portion is located at a position which is radially outward of said second annular cylindrical region of said second portion, said first annular region of said first portion is positioned on said second annular region of said second portion, and a terminal end of said first annular region of said first portion contacts an outer peripheral surface of said one end of said second annular cylindrical region.

2. The electromagnetic clutch of claim 1 wherein said first annular cylindrical region of said first portion is concentric with said second annular cylindrical region of said second portion.

3. The electromagnetic clutch of claim 1 wherein said second annular region of said second portion is fixedly secured to said mount member.

4. The electromagnetic clutch of claim 3 wherein said second annular region of said second portion is fixedly secured to said mount member by brazing.

5. The electromagnetic clutch of claim 3 wherein said second annular region of said second portion is fixedly secured to said mount member by adhesion.

6. The electromagnetic clutch of claim 1 wherein said first annular region of said first portion and said second annular region of said second portion are fixedly secured together by welding.

7. The electromagnetic clutch of claim 6 wherein said first annular region of said first portion and said second annular region of said second portion are fixedly secured together by spot welding.

8. An electromagnetic clutch comprising:
a first rotatable member of magnetic material rotatably supported on a bearing, said bearing mounted on a mount member;
said first rotatable member including an outer annular cylindrical portion, an inner annular cylindrical portion, and an axial end plate connecting said outer annular cylindrical portion and said inner annular cylindrical portion, said outer and inner annular cylindrical portions and said axial end plate defining an inner hollow space;
an electromagnetic housing fixedly secured to said mount member and extending within said inner hollow space, said electromagnetic housing being formed with a U-shaped cross section whereby an annular hollow space is defined therein;
said electromagnetic housing comprising a first portion and a second portion;
said first portion including a first annular cylindrical region and a first annular region radially extending from one end of said first annular cylindrical region in a first direction;
said second portion including a second annular cylindrical region and a second annular region radially extending from one end of said second annular cylindrical region in a second direction opposite to said first direction;
said first annular region of said first portion and said second annular region of said second portion operatively coupled together;
an annular magnetic coil fixedly disposed within said annular hollow space of said electromagnetic housing;
a second rotatable member;
a hub secured on said second rotatable member; and
a magnetic armature plate supported on said hub, said magnetic armature plate facing said first rotatable member with a predetermined axial air gap therebetween and having limited axial movement, said magnetic armature plate being attracted to said first rotatable member when said annular magnetic coil is energized;

wherein said first annular cylindrical region of said first portion is located at a position which is radially outward of said second annular cylindrical region of said second portion, said first annular region of said first portion is positioned on said second annular region of said second portion, and said first annular cylindrical region of said first portion includes an annular depression formed at an inner peripheral surface of said one end thereof.

9. The electromagnetic clutch of claim 7 wherein the terminal end of said second annular region of said second portion is firmly received within said annular depression.

10. An electromagnetic clutch comprising:
a first rotatable member of magnetic material rotatably supported on a bearing, said bearing mounted on a mount member;
said first rotatable member including an outer annular cylindrical portion, an inner annular cylindrical portion, and an axial end plate connecting said outer annular cylindrical portion and said inner annular cylindrical portion, said outer and inner annular cylindrical portions and said axial end plate defining an inner hollow space;
an electromagnetic housing fixedly secured to said mount member and extending within said inner hollow space, said electromagnetic housing being formed with a U-shaped cross section whereby an annular hollow space is defined therein;
said electromagnetic housing comprising a first portion and a second portion;
said first portion including a first annular cylindrical region and a first annular region radially extending from one end of said first annular cylindrical region in a first direction;
said second portion including a second annular cylindrical region and a second annular region radially extending from one end of said second annular cylindrical region in a second direction opposite to said first direction;
said first annular region of said first portion and said second annular region of said second portion operatively coupled together;
an annular magnetic coil fixedly disposed within said annular hollow space of said electromagnetic housing;
a second rotatable member;
a hub secured on said second rotatable member; and
a magnetic armature plate supported on said hub, said magnetic armature plate facing said first rotatable member with a predetermined axial air gap therebetween and having limited axial movement, said magnetic armature plate being attracted to said first rotatable member when said annular magnetic coil is energized;

wherein said first annular cylindrical region of said first portion is located at a position which is radially outward of said second annular cylindrical region of said second portion, said second annular region of said second portion is positioned on said first annular region of said first portion, and a terminal end of said second annular region of said second portion contacts an inner peripheral surface of said one end of said first annular cylindrical region.

11. The electromagnetic clutch of claim 10 wherein said first annular cylindrical region of said first portion includes an annular depression formed at the inner peripheral surface of said one end thereof.

12. The electromagnetic clutch of claim 11 wherein the terminal end of said second annular region of said second portion is firmly received within said annular depression.

13. The electromagnetic clutch of claim 10 wherein said first annular region of said first portion is fixedly secured to said mount member.

14. The electromagnetic clutch of claim 13 wherein said first annular region of said first portion is fixedly secured to said mount member by brazing.

15. The electromagnetic clutch of claim 13 wherein said first annular region of said first portion is fixedly secured to said mount member by adhesion.

16. The electromagnetic clutch of claim 13 wherein said first annular region of said first portion is fixedly secured to said mount member by fastening means.

17. The electromagnetic clutch of claim 16 wherein said fastening means is a snap ring.

18. The electromagnetic clutch of claim 10 wherein said first annular cylindrical region of said first portion is concentric with said second annular cylindrical region of said second portion.

19. The electromagnetic clutch of claim 10 wherein said first annular region of said first portion and said second annular region of said second portion are fixedly secured together by welding.

20. The electromagnetic clutch of claim 19 wherein said first annular region of said first portion and said second annular region of said second portion are fixedly secured together by spot welding.

* * * * *